United States Patent Office 3,404,163
Patented Oct. 1, 1968

3,404,163
EPOXIDATION PROCESS
Walter M. Budde, Jr., Prior Lake, and William H. French, St. Paul, Minn., assignors to Ashland Oil & Refining Company, Ashland, Ky., a corporation of Kentucky
No Drawing. Filed July 2, 1965, Ser. No. 469,347
12 Claims. (Cl. 260—348.5)

ABSTRACT OF THE DISCLOSURE

A process of epoxidizing olefinic materials employing a two phase liquid system by reaction of said material in an organic phase with an aliphatic peracid produced in situ in an aqueous phase, wherein the reaction system is agitated during said reaction to promote the reaction while maintaining a single continuous interface between said phases, which process results in improved yields of and conversions to epoxidized materials.

---

This invention relates to an improved epoxidation process for the epoxidation of ethylenically unsaturated materials. In another aspect, it relates to an improved two-phase batch epoxidation process for the in situ peracetic acid epoxidation of long chain, terminally unsaturated monoolefins to produce the corresponding 1,2-epoxides.

Epoxidation of ethylenically unsaturated materials during the last 10–15 years has enjoyed increasingly widespread commercial development and use. In the main, vegetable oils and fats, which have internal unsaturation, have been utilized as raw materials because of their abundance and the relative ease of epoxidizing these materials. The desirable upgrading economics of the epoxidation process and the increasing demand for a broader spectrum of epoxidized products have focused attention in the last several years on the epoxidation of terminally unsaturated mono-olefins, particularly straight-chain terminal olefins, which are becoming incrceasingly available from petrochemical sources. However, the epoxidation of terminal olefins proceeds at a much slower rate and conversion of the terminal ethylenic group or double bond to a oxirane group is not as high as compared to that obtained from the epoxidation of internally unsaturated materials such as soybean oil.

Accordingly, an object of this invention is to provide an improved epoxidation process for the epoxidation of ethylenically unsaturated materials. Another object is to provide an improved two-phase batch epoxidation process for the in situ peracetic acid epoxidation of long chain, terminally unsaturated mono-olefins, particularly straight-chain terminal olefins. Another object is to produce 1,2-epoxides at high conversions from such terminally unsaturated olefins. Further objects and advantages of this invention will become apparent to those skilled in the art from the following description and appended claims.

Briefly, according to this invention, ethylenically unsaturated materials, such as terminal olefins, are epoxidized in the liquid phase in a two-phase system with an aliphatic peracid, such as peracetic acid, generated in situ in the aqueous phase while maintaining a single, discrete, fresh or continuously-renewed interface during the course of the epoxidation reaction between the aqueous phase and the immiscible organic phase containing the unsaturated material to be epoxidized.

Maintenance of the single interface between the immiscible organic and aqueous phases of the epoxidation system or reaction mixture is preferably accomplished according to this invention by placing an agitator in the upper organic (or oil) phase and rotating it at a speed sufficient to continuously renew said interface without breaking or disrupting it, i.e., while maintaining the interfacial area at a minimum. Such agitation in no sense could be called severe or vigorous (such as that taught in the prior art, e.g., U.S. Patent No. 2,458,484) in that the agitation used in this invention does not cause dispersion or subdivision of one phase, for example, as droplets, in the other phase, as in the case of an emulsion. Rather the agitation used in this invention is properly considered as "mild agitation." The mild agitation of this invention results in agitation of the organic phase with only insignificant, if any, agitation of the lower aqueous phase. The organic and aqueous phases remain intact during this mild agitation, i.e., there is no continuous phase or discontinuous phase. When such mild agitation is employed in a glass epoxidation reaction vessel, the single interface between the organic and aqueous phases can be readily visually observed as a definite, discrete, single, substantially horizontal boundary between the two non-dispersed intact phases, and no emulsion is observed or apparent.

The mild agitation of this invention can also be obtained without the use of an internal agitator. For example, the reactor can be rocked mechanically such that the single interface is maintained but replenished with fresh reactants due to the rocking of the two phases. As another example, the mild agitation can be obtained by drawing off a stream from the oil phase, preferably close to the interface, and recirculating it back to the reactor at the top of the oil phase. As another example, a heating coil can be disposed in the reactor just above the interface to effect convective agitation of the oil phase. Also, any combination of these methods of agitation can be used, with or without an internal agitator.

The term "mild agitation" is used in this application in the sense described above and distinguished from "vigorous" agitation which is used herein to mean that agitation which disrupts the interface between the two phases, causing an emulsion to form.

This epoxidation or mild agitation technique results in minimizing side reactions and destruction of the oxirane group. In the case of epoxidation of terminally unsaturated, long chain mono-olefins, this epoxidation technique results in a significantly higher conversion of the terminal double bond to oxirane

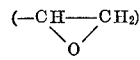

than that obtained by carrying out the epoxidation using that vigorous agitation which disrupts the interface, for example, by forming an emulsion.

In a typical batch procedure for carrying out this invention, the unsaturated material to be epoxidized and an inert liquid organic reaction solvent are charged to the epoxidation reaction vessel or zone, singly or in admixture. A lower aliphatic carboxylic acid, such as acetic acid, is also charged to the reaction vessel, and it can be charged in admixture with either or both of the unsaturated material and reaction solvent or charged prior to or after the unsaturated material and solvent are charged. After the unsaturated material, solvent, and aliphatic acid are charged, hydrogen peroxide (which can be in admixture with a strong acid catalyst such as sulfuric acid which activates the formation of the peracid) is charged to the reaction vessel, preferably while the organic phase is being agitated in the mild manner described above. The hydrogen peroxide and aliphatic acid react in situ to form the peracid. (The olefin and aliphatic acid must not be added to the hydrogen peroxide because this would lead to undesirable production of side reaction products and be hazardous.) In the preferred operation, the organic contents of the reaction vessel are heated up to the desired reaction temperature before the hydrogen peroxide is added, though such temperature can be obtained after such addition. The hydrogen peroxide can be charged all at once, though it is preferred to charge it slowly or incrementally, e.g., dropwise or in the form of a small stream. The hydrogen peroxide can be conveniently added through the top of the reaction vessel and allowed to fall through the mildly agitated organic phase. Generally, the time it takes for the addition of the hydrogen peroxide to be completely charged will be from 1 to 25 percent, preferably from 10 to 30 percent, of the total reaction time, beginning with the initial addition of the hydrogen peroxide. As the hydrogen peroxide is added, the two phases form with said discrete interface therebetween, the lower aqueous phase gradually increasing in volume. The concentration of the aliphatic acid in the lower aqueous layer also increases as the hydrogen peroxide is added.

The concentration of the aliphatic acid in the upper organic layer decreases as the hydrogen peroxide is added, because it will be more soluble in the aqueous phase. The relative concentrations of aliphatic acid in each of the upper and lower layers, after all of the hydrogen peroxide is added, will vary and be dependent upon such factors as the particular unsaturated material and solvent used and the amounts thereof. Generally, after all of the hydrogen peroxide is charged, the major amount (i.e., greater than 50%) of the aliphatic acid in the system will be concentrated in the lower aqueous layer and the minor amount (i.e., less than 50%) of the aliphatic acid in the system will be concentrated in the upper organic layer. Generally, after all of the hydrogen peroxide is charged, as epoxidation progresses the concentration of aliphatic acid in the organic phase will increase from about 20% to about 60% at the end of the reaction (these percents based on the total weight of the aliphatic acid charged). If desired, further hydrogen peroxide can be added later in the reaction to complete the reaction and obtain an epoxidized product with a desirably lower iodine value.

After all of the hydrogen peroxide mixture is added, the locus of the agitation and its speed can be adjusted or maintained so that a desirable epoxidation rate will be obtained while minimizing undesirable side reactions, e.g., splitting the oxirane ring and decomposing hydrogen peroxide. Generally, the controlled agitation will be obtained when the agitator is rotating as rapidly as possible in the upper organic phase without disrupting the single discrete interface. One or more agitators can be used and can be of any configuration, such as the paddle, rod, or impeller types, and they are preferably disposed in the upper organic phase in such a manner that the lower ends of the agitators are as close as possible to the interface without disrupting the same when the agitators are rotated, e.g., 35 to 90 r.p.m.

In carrying out the epoxidation reaction according to this invention, sufficient pressure is used to maintain a liquid phase epoxidation reaction. The reaction vessel can be equipped with a reflux condenser, and the reaction carried out at reflux at an elevated temperature which is below the boiling points of the reactants and is conducive to the undesirable rate of formation of peracid and which minimizes undersirable side reactions. Generally, this temperature will be in the range of 110–160° F., preferably in the range of 130–140° F. Lower temperatures will not be satisfactory since they will give slower reaction times and lower conversions to the oxirane compound. The reaction time will vary and be dependent upon such factors as the particular solvent used, the unsaturated material being epoxidized, the concentrations of the aliphatic acid and catalyst, and, functionally expressed, the reaction time will be that time sufficient to obtain a desired degree of conversion of double bond to oxirane ring. In the case of the epoxidation of long chain terminal mono-olefins, this reactin time will be about 10 to 28 hours, preferably 18 to 20 hours; if the reaction is terminated sooner, a lower yield of epoxidized product will be obtained.

The course of the reaction can be followed or monitored by taking periodic samples of the reaction mixture and analyzing the same for hydrogen peroxide, oxirane content or iodine value. When the desired degree of conversion has been obtained, the reaction can be terminated and the epoxidized product recovered by any convenient conventional procedure. For example, the reaction mixture can be cooled, the organic phase separated and washed with water to remove acid, stripped under a partial vacuum to remove solvent, and the residual material distilled, if desired. Alternatively, the reaction mixture can be cooled, an alkaline material, such as lime or sodium carbonate, can be added to the organic phase to neutralize any residual mineral acid, the volatile materials can be stripped off from the neutralized organic phase. The separated aqueous phase can be reused (after purification or concentration, if desired) since it will contain aliphatic acid.

The epoxidized materials produced according to this invention have a wide range of utility and can be used, for example, as plasticizers for polyvinyl chloride resins or can be used as intermediates in chemical synthesis, for example, 1,2-epoxides of terminal olefins can be converted to the corresponding alcohols, tertiary amines, tertiary amine oxides, etc., which have utility in the preparation of detergents. The epoxidation reaction vessel and associated equipment such as agitators, used in this invention should be constructed or fabricated from materials which do not affect the reaction components or products, that is, materials should be used which, when in contact with the reaction, are substantially inert in the reaction. Non-ferrous materials, stainless steel Type 316, glass (e.g., Pyrex), etc., can be used to form the confining surfaces of the reaction zone.

The ethylenically unsaturated materials which can be epoxidized according to this invention include any of those epoxidizable materials used heretofore, such as disclosed in U.S. Patent Nos. 2,458,484 and 2,977,374. A class of materials which are particularly useful in this invention are the terminally unsaturated, long chain mono-olefins, such as those having 10–24 carbon atoms, preferably 14–18 carbon atoms, per molecule. Such terminal olefins can be used singly or in admixture and they can be straight-chain or branched-chain terminal olefins. Long, straight-chain terminal mono-olefins can be obtained from petro-chemical sources, for example, by cracking of petroleum waxes or by polymerization of ethylene using Ziegler catalysts such as trialkylaluminum. Representative 1-olefins which can be used in this invention include 1-decene, 1-henedecene, 1-dodecene, 1-hexadecene, 1-octadecene, 1-eicosene, and the like, including mixtures thereof.

Table I sets forth a description and specifications for some long chain, terminal mono-olefin mixed fractions commercially available from petro-chemical sources which can be epoxidized according to this invention.

TABLE I

| | \multicolumn{6}{c}{Fractions} | | | | | |
|---|---|---|---|---|---|---|
| | $C_9$-$C_{11}$ | $C_{11}$-$C_{15}$ | $C_{12}$-$C_{16}$ | $C_{15}$-$C_{20}$ | $C_{15}$-$C_{18}$ | $C_{20}+$ |
| Total straight chain alpha olefins, percent | 87 | 87 | 93.5 | 86 | 88.8 | 69 |
| Carbon No. distribution, percent: | | | | | | |
| $C_8$ | 1 | | | | | |
| $C_9$ | 22 | | | | | |
| $C_{10}$ | 55 | 1 | 0.7 | | | |
| $C_{11}$ | 21 | 13 | | | | |
| $C_{12}$ | 1 | 24 | 41.3 | | | |
| $C_{13}$ | | 24 | | | | |
| $C_{14}$ | | 24 | 31.9 | 1 | 1 | |
| $C_{15}$ | | 13 | | 12 | 27 | |
| $C_{16}$ | | 1 | 25.6 | 19 | 29 | |
| $C_{17}$ | | | | 18 | 28 | |
| $C_{18}$ | | | | 18 | 15 | |
| $C_{19}$ | | | | 17 | | |
| $C_{20-26}$ | | | 0.5 | 15 | | 77 |
| $C_{26-42}$ | | | | | | 23 |
| Specific gravity, 20 °C., g./ml. | 0.747 | 0.769 | 0.769 | 0.790 | 0.784 | 0.865 |

The solvents which are used in carrying out the epoxidation reaction of this invention include any inert liquid water-insoluble organic solvents (i.e., one having a solubility of not more than 2 weight percent in water), such as aliphatic, cycloaliphatic and aromatic hydrocarbons, or corresponding halogenated hydrocarbons, which are miscible with the unsaturated material to be epoxidized and the aliphatic acid and have boiling points above the epoxidation reaction temperatures employed herein. Representative solvents which can be used in this invention include hexane, heptane, octane, cyclohexane, benzene, toluene, xylene, methylene chloride, tetrachloloethylene, and the like. The use of a solvent in the epoxidation reaction will repress undesired opening of the oxirane ring and when used at or close to its reflux temperatures the solvent serves as a heat reservoir for the exothermic reaction. The particular solvent used should not impart undesirable color to the product where desirable color of the product is a requirement for its utility. Benzene and toluene are especially useful as solvents where a desirable color is required. The amount of solvent employed can vary and, functionally expressed, will be that amount sufficient to enhance the reaction rate and facilitate ease of product recovery. Generally, the amount of solvent employed will be from 20 to 200 percent by weight, preferably 50 to 100 percent by weight, of the charged unsaturated material. Too low a solvent level will promote undesirable side reactions and too high a solvent level will give a lower productivity.

The aliphatic acids which can be oxidized in situ with hydrogen peroxide to form the peracids include formic acid, acetic acid, propionic acid, and butyric acid. The use of acetic acid (to form peracetic acid) is preferred as a practical manner because it is most effective and economical.

The acetic acid used in this invention is preferably concentrated, e.g., 90–100 percent, and glacial acetic acid is preferred. The amount of acetic acid used (calculated at 100 percent concentration or on a glacial basis) will generally be in the range of 0.5 to 1.5 moles per mole of unsaturation in the unsaturated material being epoxidized and is preferably 0.7 to 1.2 moles per mole of unsaturation; and in the case of epoxidation of long chain, terminal mono-olefins, 1.0 mole of acetic acid per mole of unsaturation will be particularly useful. If a greater amount of acetic acid is used, e.g., greater than 1.5 moles per mole of unsaturation in terminal olefins, the amount of side reaction products will increase, and if a lower amount of acetic acid is used, the reaction rate will be undesirably slow.

The catalysts used in this invention to promote the formation of the aliphatic percarboxylic acid include any strong acid, such as sulfuric acid, sulfamic acid, perchloric acid, phosphoric acid, and alkane-sulfonic acids as well as fulfonic acid-type cation-exchange resins, such as Dowex 50X–8 (a sulfonated copolymer of styrene with 2 to 24 percent divinyl benzene) and Amberlite IR–120 (sulfonated copolymer with 8 percent divinyl benzene). The particular acid catalyst used will depend on such factors as the material being epoxidized. The use of sulfuric acid is preferred, especially in epoxidizing terminal olefins, because of its recognized efficiency in catalyzing the formation of peracetic acid. The amount of sulfuric acid (on a 96.5 percent concentration basis) to be used in this invention generally will be from 0.8 to 1.2 weight percent, preferably 0.9 weight percent, based on the weight of aliphatic acid used in the epoxidation reaction. Where sulfuric acid is to be used as the catalyst, it is admixed with the hydrogen peroxide and the mixture is charged to the reaction vessel containing the unsaturated material, solvent, and aliphatic acid. The sulfonic acid type resins are less preferred because, under the mild agitation used according to this invention in carrying out the epoxidation reaction, good dispersion of the resin in the lower aqueous phase is difficult and the resin has a tendency to settle in the bottom of the aqueous phase, and thereby lose catalytic efficiency.

The hydrogen peroxide used in this invention is preferably aqueous hydrogen peroxide having a concentration of about 27 to 98 weight percent, preferably 50 to 90 weight percent, typically 70 weight percent. The amount of hydrogen peroxide used in this invention can vary but generally will be 15 to 50 percent, preferably 20 to 25 percent, in excess of the stoichiometric amount necessary to react with all of the ethylenic unsaturation in the unsaturated material to be epoxidized. The use of such an excess results in a fast reaction rate in the formation of peracid and produces an epoxidized product with a lower iodine value.

The following examples further illustrate the objects and advantages of this invention, but it should be understood that the particular reactants and amounts thereof, reaction conditions, and other details of these examples should not be construed to unduly limit this invention.

Example I

In this example, 1-tetradecene was epoxidized in two runs according to this invention using mild agitation, i.e., agitation of the oil phase without disrupting the interface between the two phases. For purposes of comparison, this same terminal olefin was epoxidized using vigorous agitation, i.e., agitation which disrupted the interface between the two phases and produced an emulsion.

The reactor used in these runs was a two liter, 3-neck glass flask equipped with an agitator, thermometer and reflux condenser. In all of the runs, the tetradecene, solvent (benzene), and glacial acetic acid were first charged to the flask and the homogenous organic mixture heated to reaction temperature. A mixture of the hydrogen peroxide and catalyst (sulfuric acid) was then slowly added dropwise to the flask while the contents thereof were agitated. After the hydrogen peroxide-catalyst mixture was added, the reaction was carried out with agitation until reaction was essentially completed. The reaction mixture was cooled, the organic phase separated and washed with water in a percolator, topped under vacuum, and filtered. The product (1,2-epoxy tetradecane) was then analyzed to determine the oxirane content and iodine value, and the percent conversion of double bond of the terminal olefin to oxirane was calculated.

Table II summarizes these runs.

TABLE II

| | RUNS | | | | | |
|---|---|---|---|---|---|---|
| | 1 | 2 | 3 | 4 | 5 | 6 |
| Charge: | | | | | | |
| 1-Tetradecene,[1] g | 300 | 300 | 300 | 300 | 300 | 300 |
| Solvent, g | 300 | 300 | 300 | [2] 300 | 300 | 162 |
| Glacial acetic acid, g | 81.6 | 81.6 | 100 | 81.6 | 90.7 | 81.6 |
| $H_2SO_4$, g | 0.816 | 0.816 | 1.35 | 0.816 | 0.816 | 0.735 |
| $H_2O_2$ (70%), g | 88.5 | 88.5 | 88.5 | 88.5 | 88.5 | 88.5 |
| Agitation | Vigorous | Vigorous | Vigorous | Mild | Mild | Mild |
| Reaction temp., °F | 133 | 134–136 | 136–137 | 136–137 | 135–136 | 136 |
| Reaction time, hrs | 12 | 13.5 | 21.5 | 13.5 | 19.25 | 24.25 |
| Product: | | | | | | |
| Oxirane, percent | 6.00 | 5.84 | 5.18 | 6.55 | 6.96 | 6.82 |
| Iodine value | 13.1 | 13.2 | 11.7 | 8.25 | 4.4 | 5.50 |
| Conversion, percent | 80.7 | 78.5 | 69.7 | 88.1 | 93.5 | 90.7 |

[1] Gulf tetradecene, iodine value 128, 92.6 wt. percent min. n-alpha olefins, 98.5 wt. percent min. mono-olefins 1.5 wt. percent max. saturates, min. 96 wt. percent $C_{14}$.
[2] Solvent in Run 4 was toluene, and in all other runs was benzene.

The data of Table II show a significantly superior percent conversion obtained in carrying out the epoxidation according to this invention using mild agitation of the reaction mixture.

Example II

In this example, $C_{11}$–$C_{15}$ fraction of 1-olefins (the specification of which is given in Table I, having an iodine value of 146–150) was epoxidized according to this invention using mild agitation. For purposes of comparison, similar runs were carried out using vigorous agitation. The epoxidation procedure used was similar to that of Example I. Table III summarizes these runs.

TABLE III

| | RUNS | | | |
|---|---|---|---|---|
| | 7 | 8 | 9 | 10 |
| Charge: | | | | |
| $C_{11}$–$C_{15}$ 1-olefins, g | 300 | 300 | 300 | 1050 |
| Benzene, g | 300 | 300 | 300 | 1050 |
| Glacial acetic acid, g | 106 | 106 | 95.5 | 372 |
| $H_2SO_4$, g | 0.955 | 0.955 | 0.955 | 3.34 |
| $H_2O_2$ (70%), g | 103.5 | 103.5 | 103.5 | 363 |
| Agitation, r.p.m. | [1] 140 | [2] 52 | [2] 65 | [2] 39 |
| Reaction temp., °F | 135–140 | 134–136 | 135–137 | 134–137 |
| Reaction time, hrs | 19 | 19.25 | 15 | 28.2 |
| Product: | | | | |
| Oxirane, percent | 3.42 | 7.46 | 6.91 | 7.41 |
| Iodine value | 36.0 | 7.95 | 9.30 | 5.92 |
| Acid value | 1.10 | 0.20 | 0.22 | 0.15 |
| Conversion, percent | 40.7 | 88.6 | 82.2 | 88.0 |

[1] Vigorous.
[2] Mild.

The data of Table III shows the significantly superior conversion obtained in producing 1,2-epoxides of $C_{11}$–$C_{15}$ 1-olefins according to this invention using mild agitation.

Example III

In this example, the terminal olefin $C_{11}$–$C_{15}$ fraction used in Example II was epoxidized according to this invention using mild agitation and a sulfonic-type resin as the catalyst for peracetic acid formation. In carrying out these runs, the procedure of Example I was followed except that the glacial acetic acid and resin catalyst were first charged to the reaction vessel, following by charging of the olefin feed and solvent. For purposes of comparison, a further run was made in a similar fashion except that vigorous agitation was employed. Table IV summarizes these runs.

TABLE IV

| | RUNS | | |
|---|---|---|---|
| | 11 | 12 | 13 |
| Charge: | | | |
| $C_{11}$–$C_{15}$ 1-olefins, g | 300 | 300 | 300 |
| Benzene | 300 | 300 | 300 |
| Glacial acetic acid, g | 116 | 116 | 116 |
| Resin catalyst,[1] g | 30 | 15 | 15 |
| $H_2O_2$ (70%), g | 103.5 | 103.5 | 103.5 |
| Agitation | Vigorous | Mild | Mild |
| Reaction temp., °F | 139–140 | 138–140 | 136–140 |
| Reaction time, hrs | 11.75 | 14 | 14 |
| Product: | | | |
| Oxirane, percent | 5.55 | 6.7 | 6.3 |
| Iodine value | 31.1 | 19.1 | 24.3 |
| Conversion, percent | 64.4 | 79.6 | 74.8 |

[1] Dowex 50W X-8.

The data of Table IV show the significantly superior conversion obtained in producing the 1,2-epoxides of $C_{11}$–$C_{15}$ 1-olefins according to this invention using mild agitation.

Example IV

In this example, a $C_{15}$–$C_{20}$ 1-olefin fraction (having the specification set forth in Table I and an iodine value of 105–110) was epoxidized according to this invention using mild agitation. These runs were carried out according to the procedure of Example I.

TABLE V

| | RUNS | |
|---|---|---|
| | 14 | 15 |
| Charge: | | |
| $C_{15}$–$C_{20}$ 1-olefins, g | 300 | 300 |
| Solvent, g | 300 | 300 |
| Glacial acetic acid, g | 78.7 | 71 |
| $H_2SO_4$, g | 0.71 | 0.71 |
| $H_2O_2$ (70%), g | 76.5 | 76.5 |
| Agitation (r.p.m.) | [1] 40 | [1] 40 |
| Reaction temp., °F | 136 | 135–136 |
| Reaction time, hrs | 19.75 | 15 |
| Product: | | |
| Oxirane, percent | 5.95 | 5.45 |
| Iodine value | 4.28 | 12.8 |
| Conversion, percent | 90.4 | 84.2 |

[1] Mild.

The data of Table V show the significant conversion obtained in producing 1,2-epoxides $C_{15}$–$C_{20}$ 1-olefins according to this invention using mild agitation.

Example V

In this example, a $C_{15}$–$C_{18}$ 1-olefin fraction (having the specification set forth in Table I and an iodine value of 117) was epoxidized according to this invention using mild agitation. The procedure followed was that of Example I. Table VI summarizes the data of this run and shows the high conversion of the olefin feed obtained in producing 1,2-epoxides of $C_{15}$–$C_{18}$ 1-olefins according to this invention using mild agitation.

TABLE VI

| Charge: | RUN 16 |
|---|---|
| $C_{15}-C_{18}$ 1-olefins, g. | 300 |
| Benzene, g. | 300 |
| Glacial acetaic acid, g. | 83 |
| $H_2SO_4$, g. | 0.748 |
| $H_2O_2$ (70%), g. | 81.7 |
| Agitation (44 r.p.m.) | mild |
| Reaction temperature, °F. | 134 |
| Reaction time, hours | 19.5 |
| Product: | |
| Oxirane, percent | 6.2 |
| Iodine value | 6.90 |
| Acid value | 0.15 |
| Conversion, percent | 90.3 |

Example VI

In this example, 1-hexadecene was epoxidized in two runs, using the mild agitation epoxidation technique according to this invention in one of the runs and using vigorous agitation in the other run for purposes of comparison. The epoxidation procedure used in these runs was otherwise similar to that of Example I. These runs are summarized in Table VII.

TABLE VII

| | Runs | |
|---|---|---|
| | 17 | 18 |
| Charge: | | |
| 1-hexadecene,[1] g. | 300 | 300 |
| Benzene, g. | 300 | 300 |
| Glacial acetic acid, g. | 71 | 78.6 |
| $H_2SO_4$, g. | 0.71 | 0.71 |
| $H_2O_2$ (70%), g. | 76.5 | 76.5 |
| Agitation | Vigorous | [2] Mild |
| Reaction temp., °F. | 133 | 136 |
| Reaction time, hours | 12 | 26.25 |
| Product: | | |
| Oxirane, percent | 5.93 | 6.20–6.23 |
| Iodine value | 7.8 | 1.9 |
| Conversion, percent | 91.5 | 96.0 |

[1] Gulf hexadecene, iodine value 110, 90.6 wt. percent min. n-alpha olefins, 98.5 wt. percent mono-olefins, 1.5 wt. percent max. saturates, 95 wt. percent min. $C_{16}$.
[2] 58 r.p.m.

The data of Table VII showed the significantly superior conversion obtained in producing 1,2-epoxy hexadecane according to this invention using mild agitation.

Example VIII

In this example, 1 - tetradecene (Gulf tetradecene—see footnote of Table II for specification) was epoxidized according to this invention using mild agitation. The reactor used in this example was a 20-gallon autoclave made of stainless steel, equipped with a reflux condenser and a vertical agitator shaft having three horizontal paddles. The locus of the lower paddle was disposed in the reactor so that it would be just above the interface between the organic and aqueous phases. The agitator was adjusted so that it would rotate at about 45 r.p.m. and mildly agitate the reaction mixture during admixture of reactants and during reaction. The autoclave was equipped with a cooling water jacket and automatically controlled heating means. In carrying out the reaction, 25.5 pounds of 1 - tetradecene, 25.5 pounds of benzene, and 8.18 pounds of glacial acetic acid were charged to the reactor. The contents of the reactor were then agitated and heated to 130° F. A mixture of 33.2 grams of sulfuric acid and 7.96 pounds of 70 percent hydrogen peroxide was then added dropwise to the reactor over a two-hour period. At the end of 19.25 hours' reaction time, the iodine value of the reaction mixture was 13.3, the percent oxirane was 6.34, and the percent peroxygen was 3.50. At the end of 22 hours of reaction, the iodine value of the reaction mixture was 11.6 and the amount of oxirane was 6.46 percent. At this time, 0.6 pound of 70 percent hydrogen peroxide was added. The total amount of excess hydrogen peroxide used in the reaction was 37 percent. At the end of 26 hours, the reaction was terminated. The reaction temperature during the reaction varied from 130–135° F. and was 134° F. at the time it was terminated. The terminated reaction mixture was separated into an organic phase and an aqueous phase. The organic phase was washed with water and volatile materials were stripped therefrom. The organic phase, comprising 1,2-epoxy tetradecane, had an iodine value of 8.62, an oxirane content of 6.65 percent and represented 89.4 percent conversion of the double bond of the olefin feed into oxirane.

Various modifications and alterations of this invention will become apparent to those skilled in the art without departing from the scope and spirit of this invention, and it should be understood that the foregoing description and illustrated examples should not be construed to unduly limit this invention.

We claim:

1. In the process of epoxidizing a straight chain mono-olefin of 10 to 24 carbon atoms in a two phase liquid reaction system by reaction of said olefin dissolved in an organic phase with an aliphatic percarboxylic acid produced in situ in an aqueous phase, the improvement comprising agitating the reaction system during said reaction to promote the reaction while maintaining a single continuous interface between said phases.

2. In the batch process of epoxidizing a straight chain mono-olefin of 10 to 24 carbon atoms in a two phase liquid reaction system wherein said olefin dissolved in an organic phase comprising inert water-immiscible solvent and aliphatic carboxylic acid is reacted with peracid produced in situ in an aqueous phase comprising hydrogen peroxide, aliphatic carboxylic acid and peracid-forming acid catalyst, the improvement comprising agitating said organic phase to promote said reaction while maintaining a single continuous interface between said organic and aqueous phases.

3. In the batch process of epoxidizing a straight chain mono-olefin of 10 to 24 carbon atoms in a two phase liquid reaction system wherein an aqueous mixture of hydrogen peroxide and sulfuric acid is added to a solution of said material in an inert, water-immiscible solvent and acetic acid to form immiscible organic and aqueous phases, and said olefin is reacted with peracetic acid produced in situ in the resulting aqueous phase, the improvement comprising agitating said organic phase during said reaction to promote said reaction while maintaining a single continuous interface between said organic and aqueous phases.

4. A batch process for epoxidizing an epoxidizable material comprising a terminally ethylenically unsaturated straight chain mono-olefin having 10 to 24 carbon atoms per molecule, comprising adding a mixture of aqueous hydrogen peroxide and sulfuric acid to a solution of said material in an inert liquid water-immiscible solvent and acetic acid to form immiscible organic and aqueous phases, the amount of hydrogen peroxide used being 15 to 50 percent in excess of the stoichiometric amount required to completely react with the ethylenic unsaturation in said material, the concentration of said aqueous hydrogen peroxide being in the range of about 27 to 98%, the amount of sulfuric acid used being sufficient to catalyze the reaction between the hydrogen peroxide and acetic acid, the amount of acetic acid being 0.5 to 1.5 moles per mole of ethylenic unsaturation of said material, and the amount of said solvent being 20 to 200 weight percent by weight of said material, carrying out the epoxidation reaction between said material and the resulting in situ peracetic acid at a temperaure of 110–160° F., and agitating said organic phase during said epoxidation reaction to promote the same while maintaining a single continuous interface between said organic and aqueous phases and recovering the resulting epoxidized product.

5. The process according to claim 4, wherein said solvent is a liquid aromatic hydrocarbon solvent.

6. The process according to claim 4, wherein said solvent is benzene.

7. The process according to claim 4, wherein said olefin is 1-tetradecene.

8. The process according to claim 4, wherein said olefin is 1-hexadecene.

9. The process according to claim 4, wherein said material comprises a mixture of $C_{11}$ to $C_{15}$ terminal olefins.

10. The process according to claim 4, wherein said material comprises a mixture of $C_{15}$ to $C_{18}$ terminal olefins.

11. The process according to claim 4, wherein said material comprises a mixture of $C_{15}$ to $C_{20}$ terminal olefins.

12. A batch process for epoxidizing an epoxidizable material comprising a terminally ethylenically unsaturated straight chain mono-olefin having 10 to 24 carbon atoms per molecule, comprising adding a mixture of aqueous hydrogen peroxide and sulfuric acid to a solution of said material in an inert liquid water-immiscible solvent and acetic acid to form immiscible organic and aqueous phases, the amount of hydrogen peroxide used being 15 to 50 percent in excess of the stoichiometric amount required to completely react with the ethylenic unsaturation in said material, the concentration of said aqueous hydrogen peroxide being in the range of about 50 to 90%, the amount of sulfuric acid used being sufficient to catalyze the reaction between the hydrogen peroxide and acetic acid, the amount of acetic acid being 0.7 to 1.2 moles per mole of ethylenic unsaturation in said material, and the amount of said solvent being 50 to 100 weight percent by weight of said material, carrying out the epoxidation reaction between said material and the resulting in situ peracetic acid at a temperature of 130–140° F., and agitating said organic phase during said epoxidation reaction to promote the same while maintaining a single continuous interface between said organic and aqueous phases and recovering the resulting epoxidized product.

References Cited

UNITED STATES PATENTS

| | | | |
|---|---|---|---|
| 2,443,280 | 6/1948 | Swern et al. | 260—348.5 |
| 2,810,732 | 10/1957 | Greenspan et al. | 260—348.5 |
| 2,919,283 | 12/1959 | Greenspan et al. | 260—348.5 |
| 3,219,624 | 11/1965 | Cohen | 260—348.5 |

OTHER REFERENCES

"Streamlined for Convenience," Chemical Week, Dec. 25, 1954, pp. 32 and 35.

HENRY R. JILES, *Primary Examiner.*

S. WINTERS, *Assistant Examiner.*